United States Patent
Park et al.

(10) Patent No.: US 10,353,126 B2
(45) Date of Patent: Jul. 16, 2019

(54) POLARIZING PLATE AND DISPLAY DEVICE HAVING THE SAME

(71) Applicant: LG DISPLAY CO., LTD., Seoul (KR)

(72) Inventors: WonKi Park, Paju-si (KR); DaeHeung Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 15/798,096

(22) Filed: Oct. 30, 2017

(65) Prior Publication Data
US 2018/0120486 A1    May 3, 2018

(30) Foreign Application Priority Data
Oct. 31, 2016 (KR) ........................ 10-2016-0143572

(51) Int. Cl.
G02B 5/30 (2006.01)
G02F 1/1335 (2006.01)
G02B 1/14 (2015.01)

(52) U.S. Cl.
CPC ............... *G02B 5/305* (2013.01); *G02B 1/14* (2015.01); *G02F 1/133528* (2013.01); *G02F 2202/28* (2013.01)

(58) Field of Classification Search
CPC .................................................. G02F 1/1335
See application file for complete search history.

(56) References Cited

U.S. PATENT DOCUMENTS

| 10,120,117 | B2 * | 11/2018 | Fan ...................... G02B 6/0026 |
| 2004/0096666 | A1 * | 5/2004 | Knox ..................... B32B 27/08 428/412 |
| 2005/0099562 | A1 * | 5/2005 | Nishikouji ........... G02B 5/3016 349/117 |
| 2006/0106193 | A1 | 5/2006 | Moriyama et al. |
| 2008/0023132 | A1 * | 1/2008 | Sano ........................ C09J 11/06 156/275.7 |
| 2014/0071353 | A1 * | 3/2014 | Nashiki ............... G02F 1/13338 349/12 |
| 2014/0168532 | A1 * | 6/2014 | Lin ........................ G06F 1/169 349/12 |
| 2016/0306452 | A1 * | 10/2016 | Jung ................. G02F 1/133528 |
| 2017/0235024 | A1 * | 8/2017 | Xu ........................... G02B 1/14 359/487.02 |
| 2017/0299779 | A1 * | 10/2017 | Mita ...................... C08F 222/10 |
| 2017/0338286 | A1 * | 11/2017 | Oh ........................ H01L 27/323 |
| 2018/0039133 | A1 * | 2/2018 | Xing ................... G02F 1/13338 |
| 2018/0258332 | A1 * | 9/2018 | Song ........................ B32B 7/12 |

FOREIGN PATENT DOCUMENTS

| KR | 10-2005-0067217 A | 6/2005 |
| KR | 20080055698 A | 6/2008 |
| WO | WO2012165184 | * 12/2012 ........... G02F 1/1335 |

* cited by examiner

*Primary Examiner* — Sang V Nguyen
(74) *Attorney, Agent, or Firm* — Seed Intellectual Property Law Group LLP

(57) ABSTRACT

A polarizing plate and a display device including the same of the present disclosure absorb and disperse an external impact by laminating thin films having different strengths. As described above, according to the present disclosure, instead of a thick cover window, a thin film is used so that thin thickness, light weight, and low cost of the polarizing plate may be achieved. Further, the manufacturing process is simplified and the processing cost is reduced.

16 Claims, 8 Drawing Sheets

|  |  | COMPARATIVE EXAMPLE 1 | COMPARATIVE EXAMPLE 2 | EXPERIMENTAL EXAMPLE |
|---|---|---|---|---|
| 22g BALL | 10cm | 5/5 TIMES BRIGHT DOT (NG) | 4/5 TIMES OK, 1/5 BRIGHT DOT (NG) | 5/5 TIMES OK |
|  | 30cm | 5/5 TIMES BRIGHT DOT (NG) | 5/5 TIMES BRIGHT DOT (NG) | 5/5 TIMES OK |
|  | 60cm | 4/5 TIMES BRIGHT DOT, 2/5 TIMES BROKEN (NG) | 2/5 TIMES BRIGHT DOT, 3/5 TIMES BROKEN (NG) | 5/5 TIMES OK |
|  | 100cm | 3/3 TIMES BROKEN (NG) | 5/5 TIMES BROKEN (NG) | 5/5 TIMES OK |
| 130g BALL |  | 10CM: BROKEN (NG) | 20CM: BROKEN (NG) | OK TO 80 CM |

FIG. 7

POLARIZING PLATE AND DISPLAY DEVICE HAVING THE SAME

CROSS-REFERENCE TO RELATED APPLICATIONS

This application claims the priority of Korean Patent Application No. 10-2016-0143572 filed on Oct. 31, 2016, in the Korean Intellectual Property Office, the disclosure of which is incorporated herein by reference.

BACKGROUND

Technical Field

The present disclosure relates to a polarizing plate and a display device including the same, and more particularly, to a polarizing plate which is suitable for absorbing an external impact and a display device including the same.

Description of the Related Art

Recently, as interest in information displays grows and demands for a portable information media are increased, studies and commercialization of light-weight and thin flat panel displays (FPD) replacing a cathode ray tube (CRT) which is a display device of the related art are mainly performed.

Specifically, among the flat panel displays, a liquid crystal display device (LCD) is a device which displays images using optical anisotropy of liquid crystals. The liquid crystal display is excellent in terms of a resolution, color display, and an image quality so that it is actively applied to a monitor of a notebook computer or a desktop computer.

Hereinafter, a structure of a general liquid crystal display device will be described in detail with reference to the drawing.

FIG. 1 is a cross-sectional view schematically illustrating a structure of a general liquid crystal display device.

Referring to FIG. 1, a general liquid crystal display device includes a liquid crystal panel 10 and a backlight unit (not illustrated) which is provided on a rear surface of the liquid crystal panel 10 to supply light the liquid crystal panel 10.

The liquid crystal panel 10 includes a first substrate 5, a second substrate 15, and a liquid crystal layer 30 formed between the first substrate 5 and the second substrate 15.

Even though not illustrated in detail, the first substrate 5 is a color filter substrate on which a color filter is formed and the second substrate 15 is a TFT substrate on which a driving element such as a thin film transistor and a pixel electrode are formed. Further, a driving circuit unit is equipped at a side of the second substrate 15 to apply signals to the thin film transistor and the pixel electrode formed on the second substrate 15.

Polarizing plates 1 and 11 are disposed on an upper surface and a lower surface of the liquid crystal panel 10, respectively.

In this case, the first polarizing plate 1 includes a polarizer 2 and protective layers 3a and 3b formed on both sides of the polarizer 2 and the polarizing plate 1 is attached onto the first substrate 5 by means of an adhesive 7.

A cover window 20 is attached onto the first polarizing plate 1 through a bonding agent or an air gap 8 to absorb an external impact. That is, in the related art, the impact applied from the outside is absorbed by the cover window 20 and the air gap 8.

The cover window 20 has a high strength to ensure an impact absorbing function. However, a material such as a thick glass or a plastic is used for the cover window so that a thickness, a weight, and a processing cost of the liquid crystal display device are undesirably increased.

A thickness of the glass of the cover window 20 is approximately 300 to 500 µm and chemical and physical tempering processes are necessary. Further, a strength of the plastic is lower than a strength of the glass so that a thickness of the plastic needs to be 500 µm or larger and a separate surface processing is required to increase hardness and scratch resistance.

A thickness of the air gap 8 or the bonding agent is approximately 100 to 200 µm.

Further, in order to bond the liquid crystal panel 10 and the cover window 20, complex bonding processes such as a resin applying process, a bonding process using a jig, a spreading process, a primary hardening process, a washing process, and a secondary hardening process are required. Therefore, not only a process cost, but also a lost cost due to the failure during the process may be incurred.

BRIEF SUMMARY

An object to be achieved by the present disclosure is to provide a polarizing plate which is suitable for absorbing an external impact by laminating thin films and a display device including the same.

Another object of the present disclosure is to provide a polarizing plate in which an impact absorbing function is implemented by itself, instead of the cover window and a display device including the same.

Other objects and features of the present disclosure will be described in the following configuration of the present disclosure and claims.

According to an aspect of the present disclosure, there is provided a polarizing plate including a polarizer, a first film having a first strength and a second film having a second strength.

According to another aspect of the present disclosure, there is provided a display device including a display panel having a first substrate, and the polarizing plate is attached onto the first substrate.

According to the exemplary embodiment of the present disclosure, in the polarizing plate and the display device including the same, the first film forms an outermost layer of the polarizing plate, the second film is positioned between the first film and the polarizer, and the second strength of the second film is greater than the first strength of the first film.

As described above, according to the present disclosure, in the polarizing plate and the display device including the same, a thin film is used instead of a thick cover window so that the thin thickness, light weight, and reduced cost of the polarizing plate may be achieved and the manufacturing process is simplified and the process cost is reduced.

BRIEF DESCRIPTION OF THE SEVERAL VIEWS OF THE DRAWINGS

The above and other aspects, features and other advantages of the present disclosure will be more clearly understood from the following detailed description taken in conjunction with the accompanying drawings, in which:

FIG. 7 is a table illustrating an example of an impact test result of a polarizing plate according to the present disclosure;

DETAILED DESCRIPTION

Figure 1:
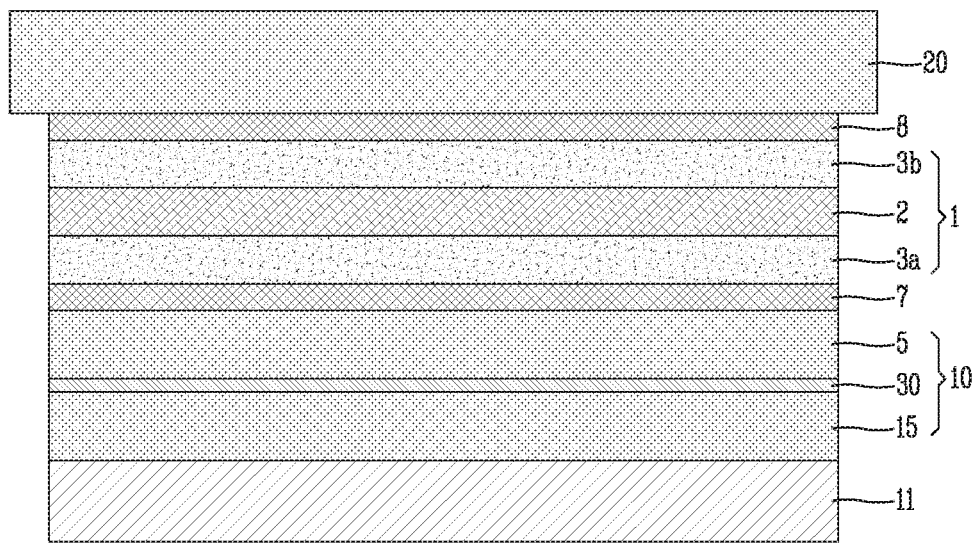
FIG. 1 is a cross-sectional view exemplarily illustrating a structure of a general liquid crystal display device.

Exemplary embodiments of a polarizing plate and a display device including the same according to the present disclosure will be described more fully hereinafter with reference to the accompanying drawings, in which exemplary embodiments of the disclosure are shown so that those skilled in the art easily carry out the exemplary embodiment of the present disclosure.

Advantages and characteristics of the present disclosure and a method of achieving the advantages and characteristics will be clear by referring to exemplary embodiments described below in detail together with the accompanying drawings. However, the present disclosure is not limited to the following exemplary embodiments but may be implemented in various different forms. The exemplary embodiments are provided only to complete disclosure of the present disclosure and to fully provide a person having ordinary skill in the art to which the present disclosure pertains with the category of the disclosure, and the present disclosure will be defined by the appended claims. Like reference numerals indicate like elements throughout the specification. In the drawings, a size and a relative size of a layer or an area may be exaggerated for clarity of description.

When an element or layer is disposed "on" other element or layer, another layer or another element may be interposed directly on the other element or therebetween. In contrast, when an element is referred to as being "immediately on" or "directly on", no intervening elements or layers may be present.

The terms, such as "below, beneath", "lower", "above", or "upper" are spatially relative terms and may be used to describe relationship between one element or component and another element or components, as illustrated in the drawings. The spatially relative term should be understood to include different directions of the element which is used or operates, in addition to the direction illustrated in the drawing. For example, when the element which is illustrated in the drawing is turned over, an element which is disposed below or beneath another element may be disposed above the other element. Therefore, an exemplary term "below" may encompass both an orientation of above and below.

The terms used in the present specification are for explaining the embodiments rather than limiting the present disclosure. Unless particularly stated otherwise in the present specification, a singular form also includes a plural form. The meaning of "comprises" and/or "comprising" used in this specification does not exclude the existence or addition of aforementioned constituent elements, steps, operations, and/or device, and one or more other constituent elements, steps, operations, and/or devices.

As an example of the display device, the liquid crystal display device is driven by two opposing electrodes and a liquid crystal layer formed therebetween. Liquid crystal molecules of the liquid crystal layer are driven by an electric field generated by applying a voltage to two electrodes.

The liquid crystal molecules have a polarization property and the optical anisotropy. The polarization property means that when the liquid crystal molecules are located in the electric field, charges in the liquid crystal molecules are concentrated on both sides of the liquid crystal molecules so that a molecule's arrangement direction is changed according to the electric field. Further, the optical anisotropy means that a path or a polarization status of emitted light is changed depending on an incident direction or a polarization status of incident light based on an elongated structure of the liquid crystal molecule and the above-described molecule's arrangement direction.

Therefore, the liquid crystal display device includes a liquid crystal panel formed of one pair of transparent insulating substrates in which electric field generating electrodes are formed by two opposing faces with the liquid crystal layer therebetween as an essential component. Further, the arrangement direction of the liquid crystal molecule is artificially adjusted by changing the electric field between the electric field generating electrodes and various images may be displayed using transmittance of light varying at this time.

In this case, polarizing plates are located above and below the liquid crystal panel. The polarizing plates may determine a transmitting degree of light by an arrangement of transmitting axes of two polarizing plates and the arrangement characteristic of liquid crystals by transmitting light having a polarized component which matches the transmitting axis.

Figure 2A:
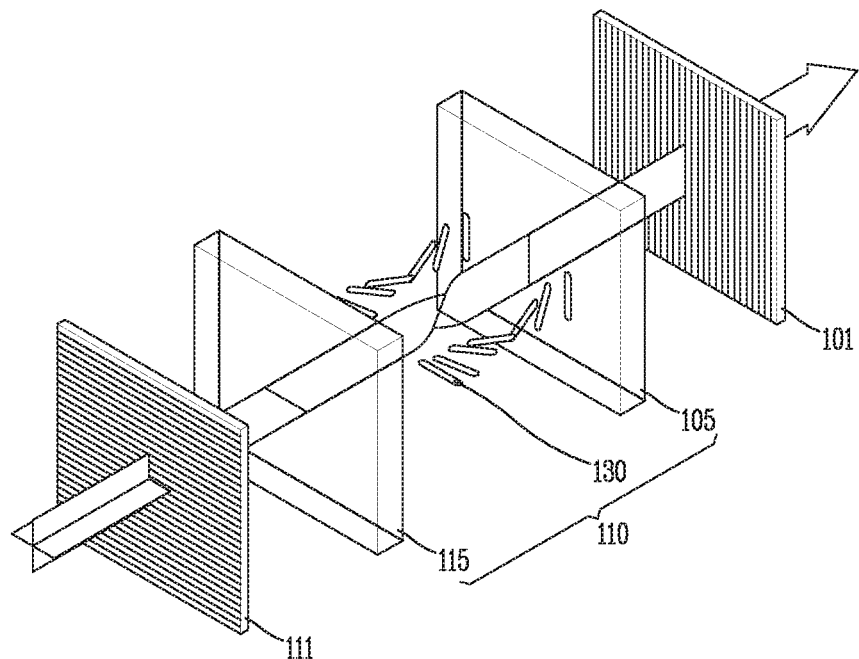
FIGS. 2A and 2B are exemplary views illustrating characteristics of light which is transmitted through a liquid crystal panel.
Figure 2B:
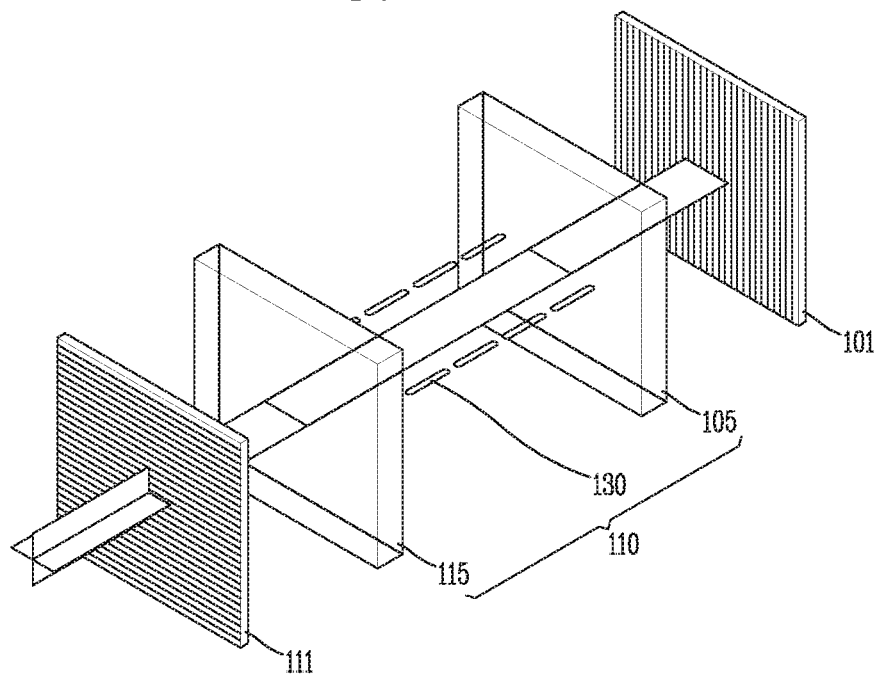

FIGS. 2A and 2B are exemplary views illustrating characteristics of light which is transmitted through a liquid crystal panel.

In this case, FIGS. 2A and 2B illustrate driving of a liquid crystal panel in a twisted nematic (TN) mode as an example. However, the present disclosure is not limited thereto and may be applicable regardless of a liquid crystal mode, such as a super TN mode (STN), a vertical alignment mode (VA), in-plane switching mode (IPS), a fringe field switching mode (FFS), or an optical compensation bend mode (OCB).

Referring to the drawings, the liquid crystal display device may mainly include a liquid crystal panel 110 and a backlight unit (not illustrated) which supplies light from a rear surface of the liquid crystal panel.

The liquid crystal panel 110 includes first and second substrates 105 and 115 boned to each other with a liquid crystal layer 130 therebetween and first and second polarizing plates 101 and 111 attached onto outer surfaces of the first and second substrates 105 and 115, respectively.

Even though not illustrated in the drawing, a color filter for implementing colors and a common electrode are equipped inside the first substrate 105. Further, a plurality of pixels in which transparent pixel electrodes are formed and a thin film transistor which on/off-controls a liquid crystal driving voltage transmitted to each pixel electrode may be equipped inside the second substrate 115.

Further, in a twisted nematic (TN) mode, the liquid crystal layer 130 interposed between the first and second substrates 105 and 115 is aligned to be twisted at an orientation angle of 90 degrees from the first substrate 105 to the second substrate 115 in an off-voltage state while maintaining a major axis direction of the molecule to be parallel to the first and second substrates 105 and 115. In this case, polarization axes of the first and second polarizing plates 101 and 111 may be orthogonal to each other.

Since the liquid crystal panel 110 does not emit light by itself, a backlight unit which supplies light to the liquid crystal panel 110 may be located on a rear surface of the liquid crystal panel 110.

When the voltage is an off-state in the liquid crystal panel 110, as illustrated in FIG. 2A, only linearly polarized light of the light emitted from the backlight unit which is parallel to the polarization axis is transmitted by the second polarizing plate 111 and the remaining is absorbed. Therefore, light rotates at 90 degrees along the orientation angle while passing through the liquid crystal layer 130 so that the light is transmitted through the first polarizing plate 101 to display white.

Next, when the voltage is an on-state, as illustrated in FIG. 2B, the major axis of the liquid crystal molecule of the liquid crystal panel 110 is arranged to be orthogonal to the first and second polarizing plates 101 and 111 so that the liquid crystal molecule loses a 90-degree optical rotatory power. Therefore, linearly polarized light which is transmitted through the second polarizing plate 111 is blocked by the first polarizing plate 101 to display black.

Figure 3:
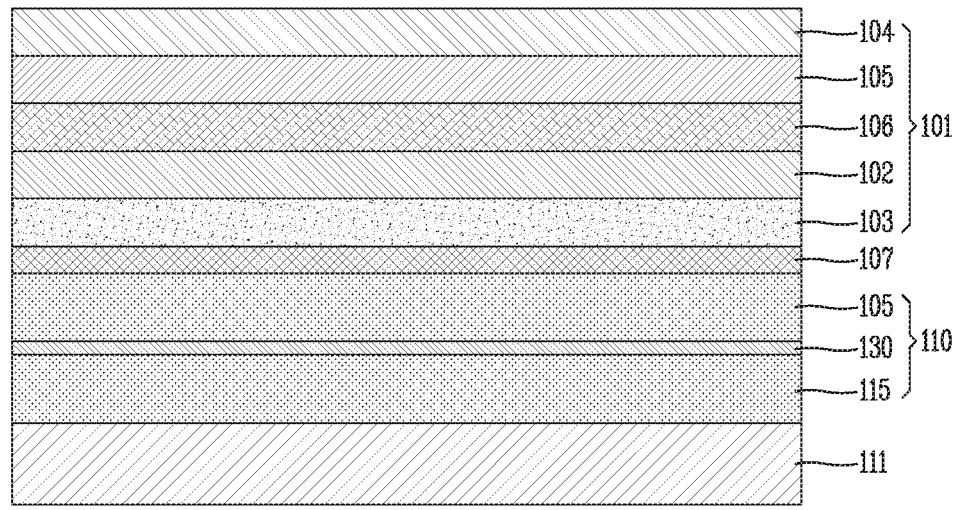
FIG. 3 is a cross-sectional view exemplarily illustrating a structure of a display device according to a first exemplary embodiment of the present disclosure.

FIG. 3 is a cross-sectional view exemplarily illustrating a structure of a display device according to a first exemplary embodiment of the present disclosure and a liquid crystal display device is illustrated as an example of the display device. However, the present disclosure is not limited to the liquid crystal display device.

Figure 4:
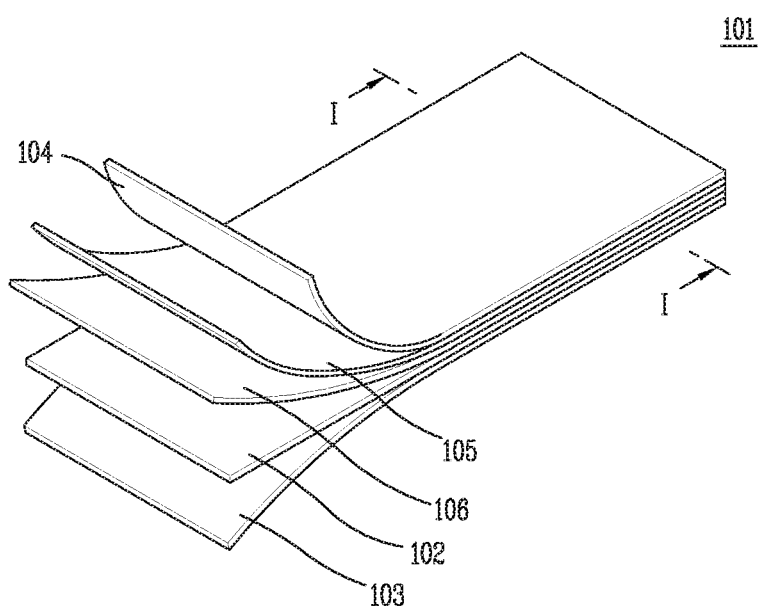
FIG. 4 is an exploded perspective view schematically illustrating a component of a polarizing plate in a display device according to a first exemplary embodiment of the present disclosure illustrated in FIG. 3.

FIG. 4 is an exploded perspective view schematically illustrating a component of a polarizing plate in a display device according to a first exemplary embodiment of the present disclosure illustrated in FIG. 3. In this case, FIG. 4 illustrates a first polarizing plate located on an upper surface of the liquid crystal panel as an example.

Referring to the drawings, a liquid crystal display device according to the first exemplary embodiment of the present disclosure includes a liquid crystal panel 110 and a backlight unit (not illustrated) which is provided on a rear surface of the liquid crystal panel 110 to supply light the liquid crystal panel 110.

The liquid crystal panel 110 is an example of a display panel in which an actual image is implemented and includes a first substrate 105, a second substrate 115, and a liquid crystal layer 130 formed between the first substrate 105 and the second substrate 115.

Even though not specifically illustrated, the first substrate 105 is a color filter substrate on which a color filter is formed. The first substrate 105 may include a color filter which is formed of a plurality of sub-color filters, a black matrix which divides the sub-color filters and blocks light transmitting the liquid crystal layer, and a transparent common electrode which applies a voltage to the liquid crystal layer.

Further, the second substrate 115 is an array substrate in which a driving element such as a thin film transistor is formed. The second substrate 115 may include a plurality of gate lines and a plurality of data lines which are vertically and horizontally disposed to define a plurality of pixel areas, thin film transistors serving as switching elements which are formed in intersection areas of the gate lines and the data lines, and a pixel electrode formed in the pixel area.

The thin film transistor may be configured by a gate electrode connected to a gate line, a source electrode connected to a data line, and a drain electrode electrically connected to the pixel electrode. Further, the thin film transistor may include an active layer which forms a conductive channel between the source electrode and the drain electrode by a gate voltage supplied to the gate electrode.

The liquid crystal panel 110 includes the backlight unit equipped on a rear surface to supply light. This is because the liquid crystal device does not include a self-emitting element so that a separate light source is required.

For example, as a light source, any one of fluorescent lamps, such as a cold cathode fluorescent lamp (CCFL), an external electrode fluorescent lamp (EEFL), and a hot cold fluorescent lamp (HCFL), and a light emitting diode (LED).

Polarizing plates 101 and 111 may be disposed on upper and lower surfaces of the liquid crystal panel 110 configured as described above.

The light emitted from the backlight unit is polarized by the second polarizing plate 111 attached to the second substrate 115. A polarization state of the light is changed while passing through the liquid crystal layer 130 and then the light is emitted to the outside through the first polarizing plate 101 attached to the first substrate 105. In this case, a transmittance of the light which is transmitted through the first polarizing plate 101 is adjusted in accordance with a change of a polarizing state of the light by the liquid crystal layer 130 so that the image may be implemented.

The first polarizing plate 101 attached to an upper surface of the liquid crystal panel 110 includes a polarizer 102, a protective layer 103 formed below the polarizer 102, first to third films 104, 105, and 106 formed above the polarizer 102.

The first polarizing plate 101 is a general polarizing element through which only light having a vibration plane in a predetermined direction is transmitted and absorbs the remaining light, among natural light having a vibration plane in all directions of 360 degrees, to obtain polarized light.

Generally, an element which divides a polarized component vertical to an incident plane and a polarized component parallel to the incident plane using a polarizer 102 having a light absorption characteristic is used and linearly polarized light and elliptically polarized light may be obtained by the polarizer 102.

To this end, an appropriate material is selected and processed to have a film shape in accordance with the purpose to obtain uniform polarization property and high polarization efficiency.

For example, a polyvinyl alcohol (PVA) film processed with iodine may be used as the polarizer 102. Further, a triacetate cellulose (TAC) film having not only stability for a size and modification and a wear resistance but also excellent transparency, ultraviolet ray absorbable property, and durability or polymethyl methacrylate (PMMA) film as an example of acryl may be used as the protection layer 103 which is an internal base material for protecting the PVA film. However, the present disclosure is not limited thereto.

The first polarizing plate 101 configured as described above may be attached to the first substrate 105 by means of the adhesive 107.

In this case, in the first polarizing plate 101 according to the first exemplary embodiment of the present disclosure, first to third films 104, 105, and 106 having different strengths are laminated above the polarizer 102, instead of a cover window of the related art, to absorb and disperse an external impact.

The first to third films 104, 105, and 106 may be formed to be thin so as to be integrated with the first polarizing plate 101 as an external base material of the first polarizing plate 101.

As described above, instead of the thick cover window, the first to third thin films 104, 105, and 106 are used so that the thin thickness, light weight, and a reduced cost of the first polarizing plate 101 may be achieved.

Further, the first to third films 104, 105, and 106 are attached at one time when the polarizing plate 101 is attached to the liquid crystal panel 110. Therefore, as compared with the cover window adhering process of the related art, the manufacturing process is simplified and the process cost is reduced. That is, in the related art, the cover window bonding process is separately performed after attaching the polarizing plate to the liquid crystal panel. In contrast, according to the present disclosure, when the polarizing plate is manufactured, films are bonded to each other by a roll-to-roll process so that the polarizing plate may be simply attached to the liquid crystal panel.

To this end, in the first polarizing plate 101 according to the present disclosure, a first film 104 having a low strength and a second film 105 having a high strength are laminated above the polarizer 102. In this case, in the first polarizing plate 101 according to the first exemplary embodiment of the present disclosure, as an example, the first film 104 having a low strength and the second film 105 having a high strength are laminated just once above the polarizer 102, but the present disclosure is not limited thereto. The strength of the films described herein may refer to a tensile strength of the films.

In this case, the first film 104 having a low strength is laminated on the second film 105 having a high strength to effectively absorb the external impact and a third film 106 having a low strength may be interposed between the second film 105 and the polarizer 102.

The first film 104 which is the uppermost layer absorbs (attenuates) the external impact to transmit the impact to a lower part and the second film 105 below the first film disperses and absorbs the attenuated external impact.

Hereinafter, an external impact absorbing mechanism of the polarizing plate according to the present disclosure will be described in detail with reference to the drawings.

Figure 5:
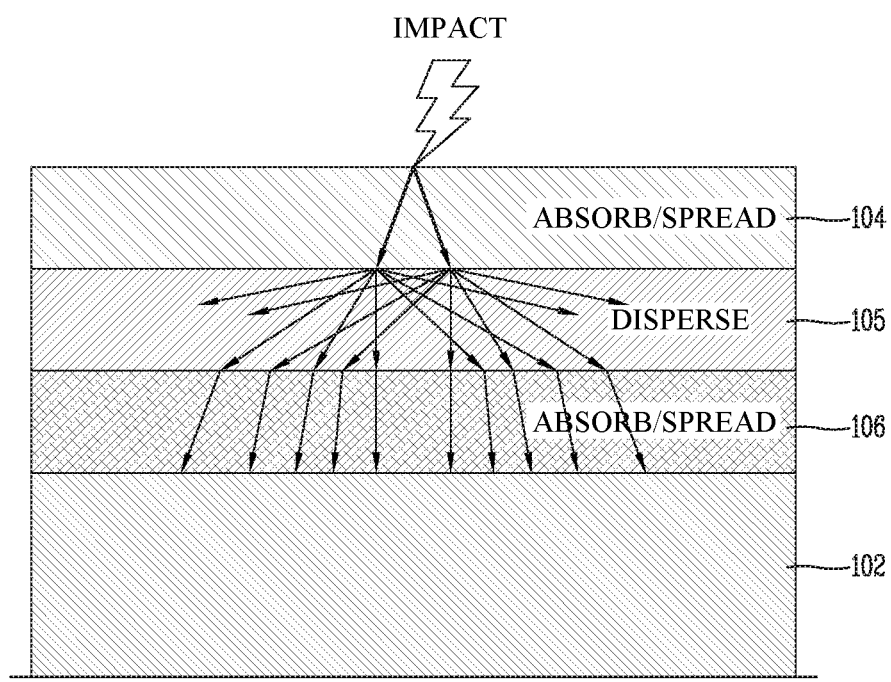
FIG. 5 is a cross-sectional view for explaining an external impact absorbing mechanism of a polarizing plate according to a first exemplary embodiment of the present disclosure.

FIG. 5 is a cross-sectional view for explaining an external impact absorbing mechanism of a polarizing plate according to a first exemplary embodiment of the present disclosure.

Figure 6A:
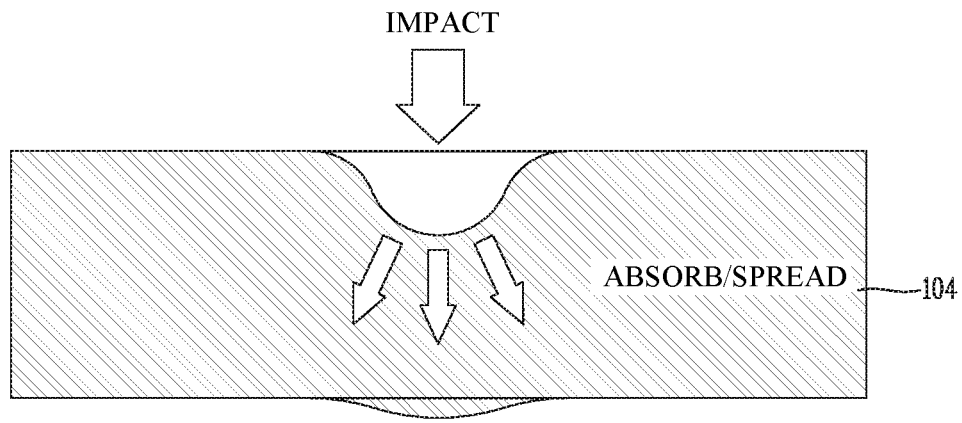
FIGS. 6A and 6B are cross-sectional views specifically illustrating the impact absorbing mechanism illustrated in FIG. 5.
Figure 6B:
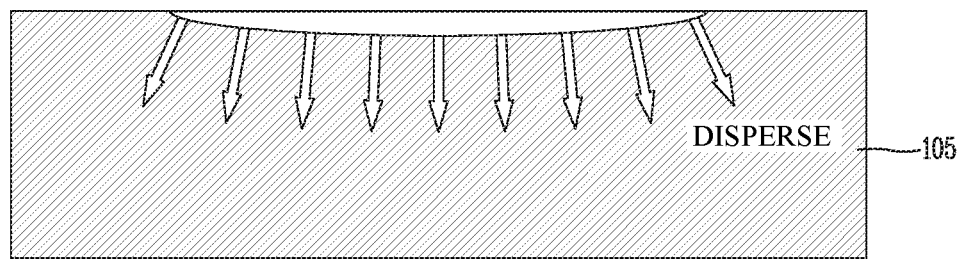

FIGS. 6A and 6B are cross-sectional views specifically illustrating the impact absorbing mechanism illustrated in FIG. 5.

Referring to FIGS. 5 and 6A, the external impact which is applied to the first polarizing plate 101 may be absorbed by the first film 104 which is the uppermost layer to be transmitted to a lower part.

In this case, the first film 104 may be configured by a low strength film, desirably, a low strength and high hardness film.

As described above, according to the present disclosure, since the uppermost layer of the first polarizing plate 101 is configured by a low strength film, the external impact is attenuated to be transmitted to the lower part. In this case, if the uppermost layer is configured by a high strength film, the impact is not absorbed (or attenuated) so that the high strength film may be damaged (broken or cracked).

The external impact which is applied to the first film 104 having a low strength is absorbed (attenuated) in a predetermined area (comparatively narrow area) of the first film 104 and the attenuated impact is transmitted to the lower part.

As the low strength film, TAC, acryl, or polyethylene terephthalate (PET), or cyclo olefin polymer (COP) may be used. The first film 104 may have tensile/bending elasticity modulus of 10 to 500 MPa, and desirably 100±10 MPa. This is also referred to as the tensile modulus of elasticity in some literature. Further, a thickness of the first film 104 may be 50 to 150 μm, and desirably 100±10 μm.

As described above, the first film 104 is a surface coating layer having high hardness, scratch resistance, and fouling resistance and serves as a supporting layer. Further, when an impact is applied, the first film 104 serves as a cushion and is supported by the second film 105 having a high strength disposed therebelow to suppress the direct damage of the surface processing layer having high hardness.

Next, referring to FIGS. 5 and 6B, the external impact which is reduced by the first film 104 having a low strength is dispersed and absorbed by the second film 105 disposed therebelow.

In this case, the second film 105 may be configured by a high strength film, desirably, a high strength and low hardness film.

As described above, according to the present disclosure, since the second film 105 having a high strength is located below the first film 104 having a low strength, the external impact attenuated by the first film 104 may be dispersed and absorbed. In this case, the impact remaining after being absorbed is broadly dispersed and spread to suppress the damage of the underlying layers.

As the high strength film, a high strength polymer material such as polyimide (PI) or tempered acyl, or polycarbonate (PC) may be used. The second film 105 may have tensile/bending elasticity modulus of 1000 to 50000 MPa, and desirably, 10000±1000 MPa. Further, a thickness of the second film 105 may be 50 to 150 μm, and desirably 100±10 μm.

In this case, the second film 105 having a high strength is a major layer for dispersing and absorbing an impact and broadly disperses and spreads the impact remaining after being absorbed to suppress the damage of the underlying layers. When the second film 105 is configured by a low strength film like a sponge rather than a high strength film, the remaining impact is not dispersed so that the underlying layers may be damaged.

As described above, the first polarizing plate 101 according to the first exemplary embodiment of the present disclosure may absorb the external impact by laminating the first film 104 having a low strength and the second film 105 having a high strength above the polarizer 102.

In this case, in order to additionally absorb the impact, the third film 106 having a low strength may be interposed between the second film 105 and the polarizer 102.

The third film 106 is a low strength film and may have substantially the same material and thickness as the first film 104.

The third film 106 having a low strength additionally absorbs (cancels) the impact and also serves as a protective base material of the polarizer 102.

As described above, the first film 104 having a low strength needs to be laminated on an uppermost layer of the first polarizing plate 101. Basically, the first film 104 having a low strength and the second film 105 having a high strength therebelow need to be laminated at least once. Therefore, the first film 104 having a low strength and the second film 105 having a high strength may be alternately laminated at least two times according to a level of a required impact resistance characteristic.

FIG. 7 is a table illustrating an example of an impact test result of a polarizing plate according to the present disclosure.

In this case, FIG. 7 illustrates an impact test result when balls of 22 g and 130 g are dropped from heights of 10, 30, 60, and 100 cm as an example.

In this case, in Comparative Example 1, a normal polarizing plate in which TAC is laminated as an external base material on the polarizer is exemplified and in Comparative Example 2, a polarizing plate in which a high strength polyimide film is laminated above the polarizing plate of Comparative Example 1 is exemplified.

In Experimental Example, a polarizing plate in which a polyimide film having a high strength and a TAC film having a low strength are laminated above the polarizing plate of Comparative Example 1 is exemplified.

In this case, the liquid crystal is attached to a lower portion of the polarizing plate using an adhesive and TAC is used as the internal base material. Thicknesses of the liquid panel, the adhesive, TAC, and PVA used for the test are approximately 600 μm, 13 μm, 20 μm, and 12 μm, respectively. Further, a thickness of TAC which is an external base material of Comparative Examples 1 and 2, and Experimental Example is approximately 25 μm and a thickness of the high strength polyimide film of Comparative Example 2 is approximately 60 μm. Further, thicknesses of the high strength polyimide film of Experimental Example and the TAC film having a low strength are approximately 50 μm and 60 μm.

Referring to FIG. 7, in Comparative Example 1 of the normal polarizing plate, when a ball of 22 g is dropped from an upper portion, in all five tests, a bright dot defect is generated in the heights of 10 cm and 30 cm.

Further, in the height of 60 cm, during five tests, the bright dot defect is generated in four tests and "broken" (liquid crystal panel) is generated in two tests. During all three tests in the height of 100 cm, the liquid crystal panel is broken.

When the ball of 130 g is dropped from the upper portion, the liquid crystal panel is broken in the height of 10 cm.

Next, in Comparative Example 2 in which the high strength polyimide film is laminated, when the ball of 22 g is dropped from the upper portion, during the five tests, in the height of 10 cm, the bright dot defect is not generated in four tests but in the height of 30 cm, the bright dot defect is generated in all five tests.

Further, in the height of 60 cm, during five tests, the bright dot defect is generated in four tests and "broken" (crack of a surface layer) is generated in three tests. In all three tests in the height of 100 cm, the liquid crystal panel is cracked.

When the ball of 130 g is dropped from the upper portion, the liquid crystal panel is cracked in the height of 20 cm.

Next, in Experimental Example in which a polyimide film having a high strength and a TAC film having a low strength are laminated, when the ball of 22 g is dropped from the upper portion, in the heights of 10 cm, 30 cm, 60 cm, and 100 cm, the bright dot defect and "broken" are not generated in all five tests.

Further, when a ball of 130 g is dropped from the upper portion, the liquid crystal panel is not broken until 80 cm.

As described above, the external impact is absorbed by laminating the thin films having different strengths above the polarizer. In this case, a film having a low strength is laminated on an uppermost layer and a high strength film is laminated therebelow.

In order to completely absorb the external impact, the present disclosure may be applied to a case when the film having a low strength and a film having a high strength are alternately laminated plural times, which will be described in detail through a second exemplary embodiment of the present disclosure.

Figure 8:
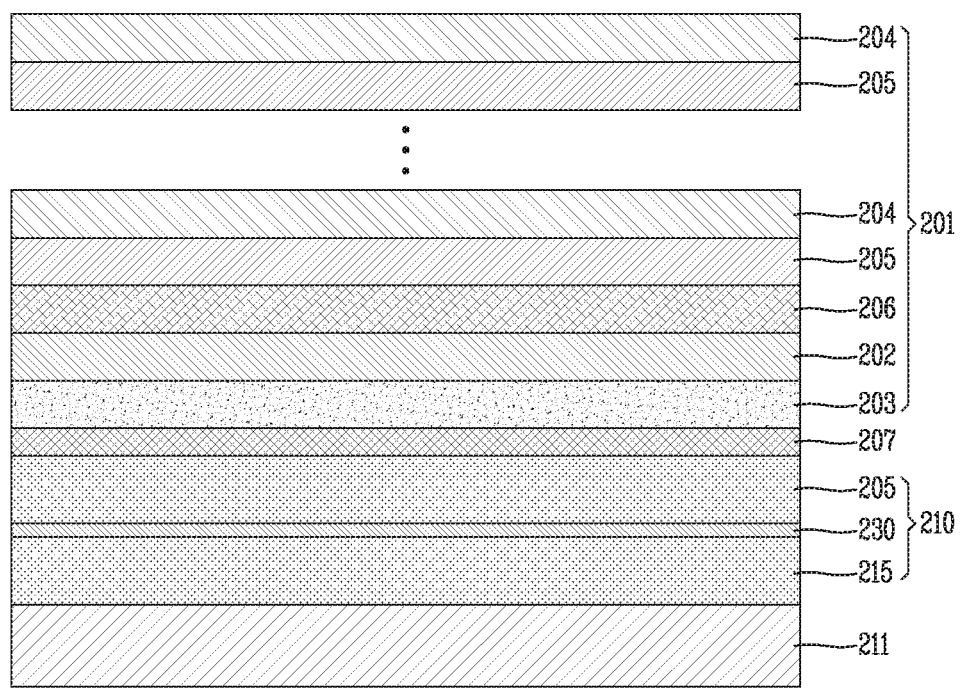
FIG. 8 is a cross-sectional view exemplarily illustrating a structure of a display device according to a second exemplary embodiment of the present disclosure.

FIG. 8 is a cross-sectional view exemplarily illustrating a structure of a display device according to a second exemplary embodiment of the present disclosure in which a liquid crystal display device is illustrated as an example of the display device. However, as described above, the present disclosure is not limited to the liquid crystal display device.

A display device according to a second exemplary embodiment of the present disclosure illustrated in FIG. 8 may be configured by substantially the same configuration as the display device according to the first exemplary embodiment of the present disclosure as described above, except that a film having a low strength and a film having a high strength are alternately laminated plural times.

Referring to FIG. 8, a liquid crystal display device according to the second exemplary embodiment of the present disclosure includes a liquid crystal panel 210 and a backlight unit (not illustrated) which is provided on a rear surface of the liquid crystal panel 210 to supply light the liquid crystal panel 210.

In the liquid crystal panel 210, an actual image is implemented. The liquid crystal panel 210 includes a first substrate 205, a second substrate 215, and a liquid crystal layer 230 formed between the first substrate 205 and the second substrate 215.

Polarizing plates 201 and 211 may be disposed on upper and lower surfaces of the liquid crystal panel 210 configured as described above.

The light emitted from the backlight unit is polarized by the second polarizing plate 211 attached to the second substrate 215. A polarization state of the light is changed while passing through the liquid crystal layer 230 and then the light is emitted to the outside through the first polarizing plate 201 attached to the first substrate 205. In this case, a transmittance of the light which is transmitted through the first polarizing plate 201 is adjusted in accordance with a change of a polarizing state of the light by the liquid crystal layer 230 so that the image may be implemented.

The first polarizing plate 201 attached to an upper surface of the liquid crystal panel 210 includes a polarizer 202, a protective layer 202 which is an internal base material formed below the polarizer 202, a third film 206, and a plurality of first films 204 and a plurality of second films 205 formed above the polarizer 202.

The first polarizing plate 201 may be attached to the first substrate 205 by means of the adhesive 207.

In this case, in the first polarizing plate 201 according to the second exemplary embodiment of the present disclosure, first and second films 204 and 205 having different strengths are laminated above the polarizer 202, instead of a cover window of the related art, to absorb and disperse an external impact. That is, the first films 204 having a low strength and the second films 205 having a high strength may be alternately laminated at least two times according to a level of a required impact resistance characteristic.

The first to third films 204, 205, and 206 may be formed to be thin so as to be integrated with the first polarizing plate 201 as an external base material of the first polarizing plate 201.

As described above, instead of the thick cover window, the first to third thin films 204, 205, and 206 are used so that the thin thickness, light weight, and a reduced cost of the first polarizing plate 201 may be achieved.

Further, the first to third films 204, 205, and 206 are attached at one time when the polarizing plate 201 is attached to the liquid crystal panel 210. Therefore, as compared with the cover window adhering process of the related art, the manufacturing process is simplified and the process cost is reduced.

To this end, in the second polarizing plate 201 according to the second exemplary embodiment of the present disclosure, the first film 204 having a low strength and the second films 205 having a high strength are alternately laminated plural times above the polarizer 202.

In this case, in order to effectively absorb the external impact, the first film 204 having a low strength is laminated on an uppermost layer and the second film 205 having a high strength is laminated therebelow and the alternate lamination may be performed plural times. Further, the third film 206 having a low strength may be interposed between the second film 205 which is the lowermost layer and the polarizer 202.

The first film 204 which is the uppermost layer absorbs (attenuates) the external impact to downwardly transmit the impact and the second film 205 below the first film disperses and absorbs the attenuated external impact. Such an external impact absorbing mechanism is applied to the first and second films 204 and 205 which are laminated therebelow plural times in the same way to completely absorb the impact.

As described above, the first film 204 may be configured by a low strength film, desirably, a low strength and high hardness film.

As the low strength film, TAC, acryl, or polyethylene terephthalate (PET), or cyclo olefin polymer (COP) may be used. The first film 204 may have tensile/bending elasticity modulus of 10 to 500 MPa, desirably, 100±10 MPa. Further, a thickness of the first film 204 may be 50 to 150 µm, and desirably 100±10 µm.

The second film 205 may be configured by a high strength film, desirably, a high strength and low hardness film.

As the high strength film, a high strength polymer material such as polyimide (PI) or tempered acyl, or polycarbonate (PC) may be used. The second film 205 may have tensile/bending elasticity modulus of 1000 to 50000 MPa, and desirably, 10000±1000 MPa. Further, a thickness of the second film 205 may be 50 to 150 µm, and desirably 100±10 µm.

In this case, in order to additionally absorb the impact, a third film 206 having a low strength may be interposed between the second film 205 which is the lowermost layer and the polarizer 202.

The third film 206 is a low strength film and may have substantially the same material and thickness as the first film 204.

The third film 206 having a low strength additionally absorbs (cancels) the impact and also serves as a protective base material of the polarizer 202.

According to the present disclosure, in order to effectively absorb the impact, a bonding agent or an adhesive may be interposed between the first to third films, which will be described in detail through a third exemplary embodiment of the present disclosure.

Figure 9:
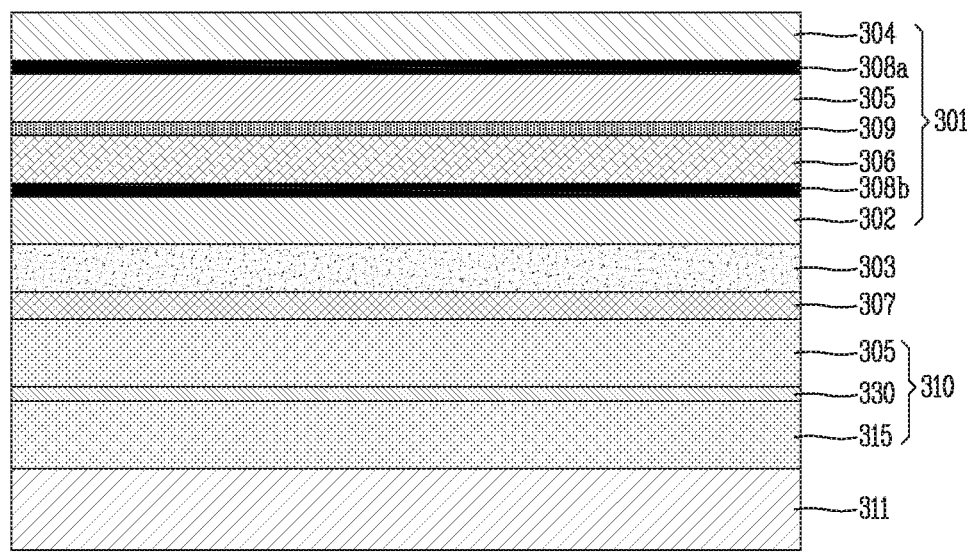
FIG. 9 is a cross-sectional view exemplarily illustrating a structure of a display device according to a third exemplary embodiment of the present disclosure.

FIG. 9 is a cross-sectional view exemplarily illustrating a structure of a display device according to a third exemplary embodiment of the present disclosure in which a liquid crystal display device is illustrated as an example of the display device. However, as described above, the present disclosure is not limited to the liquid crystal display device.

A display device according to a third exemplary embodiment of the present disclosure illustrated in FIG. 9 may be configured by substantially the same configuration as the display device according to the first exemplary embodiment of the present disclosure as described above, except that a bonding agent or an adhesive is interposed between the first to third films.

Referring to FIG. 9, a liquid crystal display device according to the third exemplary embodiment of the present disclosure includes a liquid crystal panel 310 and a backlight unit (not illustrated) which is provided on a rear surface of the liquid crystal panel 310 to supply light the liquid crystal panel 310.

In the liquid crystal panel 310, an actual image is implemented. The liquid crystal panel 310 includes a first substrate 305, a second substrate 315, and a liquid crystal layer 330 formed between the first substrate 305 and the second substrate 315.

Polarizing plates 301 and 311 may be disposed on upper and lower surfaces of the liquid crystal panel 310 configured as described above.

The first polarizing plate 301 attached to an upper surface of the liquid crystal panel 310 includes a polarizer 302, a protective layer 303 which is an internal base material formed below the polarizer 302, a plurality of first to third films 304, 305, and 306 formed above the polarizer 302.

The first polarizing plate 301 may be attached to the first substrate 305 by means of the adhesive 307.

In the first polarizing plate 301 according to the third exemplary embodiment of the present disclosure, substantially similarly to the first exemplary embodiment of the present disclosure as described above, the first film 304 having a low strength and the second film 305 having a high strength are alternatively laminated above the polarizer 302. In this case, in the first polarizing plate 301 according to the third exemplary embodiment of the present disclosure, as an example, the first film 304 having a low strength and the second film 305 having a high strength are laminated just once above the polarizer 302, but the present disclosure is not limited thereto.

In this case, the first film 304 having a low strength is laminated on the second film 305 having a high strength to effectively absorb the external impact and a third film 306 having a low strength may be interposed between the second film 305 and the polarizer 302.

The first film 304 as the uppermost layer absorbs (attenuates) the external impact to downwardly transmit the impact and the second film 305 below the first film disperses and absorbs the attenuated external impact.

As described above, the first film 304 may be configured by a low strength film, desirably, a low strength and high hardness film.

As the low strength film, TAC, acryl, or polyethylene terephthalate (PET), or cyclo olefin polymer (COP) may be used. The first film 304 may have tensile/bending elasticity modulus of 10 to 500 MPa, desirably, 100±10 MPa. Further, a thickness of the first film 304 may be 50 to 150 µm, and desirably 100±10 µm.

The second film 305 may be configured by a high strength film, desirably, a high strength and low hardness film.

As the high strength film, a high strength polymer material such as polyimide (PI) or tempered acyl, or polycarbonate (PC) may be used. The second film 305 may have tensile/bending elasticity modulus of 1000 to 50000 MPa, and desirably, 10000±1000 MPa. Further, a thickness of the second film 305 may be 50 to 150 µm, and desirably 100±10 µm.

In this case, in order to additionally absorb the impact, a third film 306 having a low strength may be interposed between the second film 305 and the polarizer 302.

The third film 306 is a low strength film and may have substantially the same material and thickness as the first film 304.

The third film 306 having a low strength additionally absorbs (cancels) the impact and also serves as a protective base material of the polarizer 302.

Further, in the first polarizing plate 301 according to the third exemplary embodiment of the present disclosure, in order to more effectively absorb the external impact, a bonding agent 309 or first and second adhesives 308a and 308b are interposed between the first to third films 304, 305, and 306.

In this case, the thickness of the bonding agent 309 is approximately 5 to 25 µm and the bonding agent has a very low rigidity so that it serves as a cushion layer which absorbs the impact. However, the bonding agent is disadvantageous to suppress the damage of the underlying layers due to insufficient impact dispersion.

Therefore, the bonding agent 309 is interposed between the second film 305 having a high strength and the lower third film 306 having a low strength to serve as a cushion layer which reduces an absolute amount of the impact when the impact dispersed by the second film 305 having a high strength is spread to the underlying layers.

Further, thicknesses of the first and second adhesives 308a and 308b are approximately 1 to 3 µm and the first and second adhesives 308a and 308b have a high rigidity and high hardness so that it is advantageous to disperse the impact but is disadvantageous in terms of crack.

Therefore, the first adhesive 308a is interposed between the first film 304 having a low strength which is the uppermost layer and the second film 305 having a high strength and is advantageous to show a hardness characteristic of the first film 304 having a high hardness. Further, the first adhesive 308a is advantageous to improve the strength of the second film 305 having a high strength and suppress the direct damage due to the impact.

The second adhesive 308b may be interposed between the lower third film 306 having a low strength and the polarizer 302 and is advantageous to control a stretching stress expression of the polarizer 302. However, when there is a concern about a damage of the underlying layers, the second adhesive may be replaced by the bonding agent.

The polarizing plate according to the exemplary embodiments of the present disclosure and the display device having the same can also be described as follows:

According to an exemplary embodiment of the present disclosure, the polarizing plate includes a polarizer and a first film having a low strength and a second film having a high strength above the polarizer, wherein the first film is located on an uppermost layer and the second film is located therebelow and the first film has a relatively low strength as compared with the second film.

The first film and the second film may be alternately laminated above the polarizer plural times.

The polarizing plate may further comprising: a third film interposed between the second film and the polarizer and may have a relatively low strength as compared with the second film.

The first film may absorb (attenuate) the external impact to transmit the attenuated impact to the lower part and the second film may disperse and absorb the external impact attenuated by the first film.

The first film may be configured by a low strength and high hardness film.

The first film may be configured by any one of triacetate cellulose (TAC), acryl, polyethylene terephthalate (PET), and cyclo olefin polymer (COP).

The first film may have tensile/bending elasticity modulus of 10 to 500 MPa, and desirably, 100±10 MPa.

The second film may be configured by any one of polyimide (PI), tempered acyl, and polycarbonate (PC).

The second film may have tensile/bending elasticity modulus of 1000 to 50000 MPa, and desirably, 10000±1000 MPa.

The polarizing plate of the present disclosure may further comprising: an adhesive interposed between the second film and the third film.

The polarizing plate of the present disclosure may further comprising: a first bonding agent interposed between the first film and the second film.

The polarizing plate of the present disclosure may further comprising: a second bonding agent interposed between the third film and the polarizer.

According to an exemplary embodiment of the present disclosure, The display device includes a display panel in which the polarizing plate is attached onto a first substrate.

The display device of the present disclosure may further comprising: another adhesive interposed between the polarizing plate and the display panel.

Although many details have been described in the above description, the details do not restrict the scope of the present disclosure but is interpreted as an example of an exemplary embodiment. Therefore, the present disclosure is not determined by the above-described exemplary embodiment, but needs to be determined by the claims and equivalents thereof.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:
1. A polarizing plate, comprising:
a polarizer;
a first film configured to a low strength and high hardness film on an outermost layer of the polarizing plate, the first film having a first strength formed by triacetate cellulose (TAC), or acryl, or polyethylene terephthalate (PET), or cyclo olefin polymer (COP), with a tensile/bending elasticity modulus within a range of 10 MPa to 500 MPa; and a second film configured to a high strength and low hardness film, the second film having a second strength formed by polyimide (PI), or tempered acyl, or polycarbonate (PC), with a tensile/bending elasticity modulus within a range of 1000 MPa to 50000 MPa, the second film is positioned between the first film and the polarizer, wherein the second strength is greater than the first strength.

2. The polarizing plate according to claim 1, wherein the first film and the second film are alternately laminated above the polarizer plural times.

3. The polarizing plate according to claim 1, further comprising:
a third film positioned between the second film and the polarizer, the third film having a third strength that is less than the second strength of the second film.

4. The polarizing plate according to claim 3, further comprising:
an adhesive interposed between the second film and the third film.

5. The polarizing plate according to claim 3, further comprising:
a bonding agent interposed between the third film and the polarizer.

6. The polarizing plate according to claim 1, wherein the first film is configured to the low strength and high hardness film so as to absorb and attenuate an external impact and transmit the attenuated external impact to the second film, and the second film is configured to the high strength and low hardness film so as to disperse and absorb the external impact attenuated by the first film.

7. The polarizing plate according to claim 1, wherein the first film has a tensile/bending elasticity modulus of 100±10 MPa.

8. The polarizing plate according to claim 1, wherein the second film has a tensile/bending elasticity modulus of 10000±1000 MPa.

9. The polarizing plate according to claim 1, further comprising:
a first bonding agent interposed between the first film and the second film.

10. A display device, comprising:
a display panel having a first substrate; and
a polarizing plate attached to first substrate, the polarizing plate including:
a polarizer;
a first film configured to a low strength and high hardness film on an outermost layer of the polarizing plate, the first film having a first strength formed by triacetate cellulose (TAC), or acryl, or polyethylene terephthalate (PET), or cyclo olefin polymer (COP), with a tensile/bending elasticity modulus within a range of 10 MPa to 500 MPa; and
a second film configured to a high strength and low hardness film, the second film having a second strength formed by polyimide (PI), or tempered acyl, or polycarbonate (PC), with a tensile/bending elasticity modulus within a range of 1000 MPa to 50000 MPa, the second strength is greater than the first strength, and the second film is positioned between the first film and the polarizer.

11. The display device according to claim 10, further comprising:
an adhesive interposed between the polarizing plate and the first substrate of the display panel.

12. The display device of claim 10, wherein the display panel includes a second substrate opposite to the first substrate, and a liquid crystal layer between the first and second substrates.

13. The display device of claim 12, further comprising a second polarizing plate attached to the second substrate of the display panel.

14. The display device of claim 10, wherein the first film has a tensile/bending elasticity modulus of 100±10 MPa.

15. The display device of claim 10, wherein the second film has a tensile/bending elasticity modulus of 10000±1000 MPa.

16. The display device of claim 10, wherein the polarizing plate further includes:
a third film positioned between the second film and the polarizer, the third film having a third strength that is less than the second strength of the second film.

* * * * *